Figure 1:
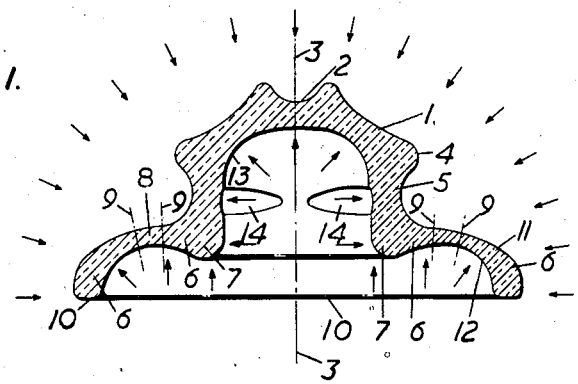

Feb. 21, 1961   P. E. JELLYMAN ET AL   2,972,211
METHOD OF MANUFACTURING A GLASS INSULATOR
Filed June 21, 1955

Inventors
Philip Ernest Jellyman
Hamish Fraser Macintosh
John Edward Wilcock
By
Morrison, Kennedy, Campbell
Attorneys

United States Patent Office 2,972,211
Patented Feb. 21, 1961

2,972,211

METHOD OF MANUFACTURING A GLASS INSULATOR

Philip E. Jellyman, Eccleston, St. Helens, England, Hamish Fraser Macintosh, Brora, Scotland, and John E. Wilcock, St. Helens, England, assignors to Pilkington Brothers Limited, Liverpool, England, a corporation of Great Britain Filed June 21, 1955, Ser. No. 516,992

Claims priority, application Great Britain July 26, 1954

1 Claim. (Cl. 49—79)

This invention relates to the manufacturing of glass insulators such as are used to support power lines and which sustain heavy loads for a long time. Such insulators comprise a hollow head and a skirt (or shed) emanating radially from the head, which head and skirt are symmetrically arranged about the axis of the insulator, the head carrying the mechanical load.

In order to improve the mechanical strength of these glass insulators, it has been proposed to toughen the head whilst the skirt is either untoughened or has a degree of toughening which is so low that breakage of the skirt does not cause the remainder of the insulator to disintegrate, and it has also been proposed to toughen the insulator as a whole, the rate of cooling of thinner portions being lower than the rate of cooling of the thicker portions.

Glass is toughened by subjecting the glass when at a temperature just above the softening point of the glass to a rapid cooling effected by the directing jets (termed "quenching jets") on the glass. The degree of toughening achieved varies with the rate of cooling. The toughened glass comprises outer layers under compression which envelop glass in tension, hence the type of disintegration into small sections (termed "dicing") of toughened glass which occurs when the surface layer is fractured.

Electrical insulators are produced by flowing the requisite sized gob into a mould and pressing the glass to the requisite shape. In the glass when the mould is opened, differences in temperature occur, the glass in contact with the wall of the mould having a lower temperature than the rest of the glass, and before a toughening operation on such an insulator is started it is necessary to place the insulator in a temperature-equalising furnace, a suitable temperature being about 1275° F. (690° C.) which is close to the softening point of the glass.

A main object of the present invention is to provide an improved method of manufacturing glass insulators of the form described in which an annular zone is produced in the skirt and as near as possible to the head, which zone prevents the propagation of a fracture initiated in the part of the skirt below the zone through the zone upwards to the head.

The present invention comprises a method of manufacturing a glass insulator of the kind used for supporting electrical power lines and including a head and skirt, said skirt comprising a radial portion emanating from the base of the head, characterised by producing the insulator by a pressing operation in which an annular zone is formed in the radial portion of the skirt, the zone being of somewhat less thickness than that of the ambient glass and the upper and under surfaces of the zone being confluent with the surfaces in the ambient glass, passing the insulator through a temperature-equalising furnace and then cooling the insulator, by simultaneously and symmetrically directing gentle streams of cooling gas, for example air or steam, on to the whole external and internal surface of the insulator, after it has left the temperature-equalising furnace, and thereby a slightly toughened product is obtained, that is to say, the degree of toughening obtained is not such as to produce "dicing" on a fracture occuring in the glass; but experiments have shown that an insulator thus obtained is approximately three times as strong as an insulator which is completely annealed in the well known manner.

The invention also comprises a glass insulator of the form used for supporting electrical power lines and including a head and skirt, said skirt comprising a radial portion emanating from the base of the head, characterised by an annular zone in the radial portion of the skirt produced by a pressing operation, the zone being of somewhat less thickness than that of the ambient glass, the upper and under surfaces of the zone being confluent with the surfaces in the ambient glass, the insulator being slightly toughened by gentle air streams directed simultaneously and symmetrically over the whole surface of the insulator.

Figure 2:
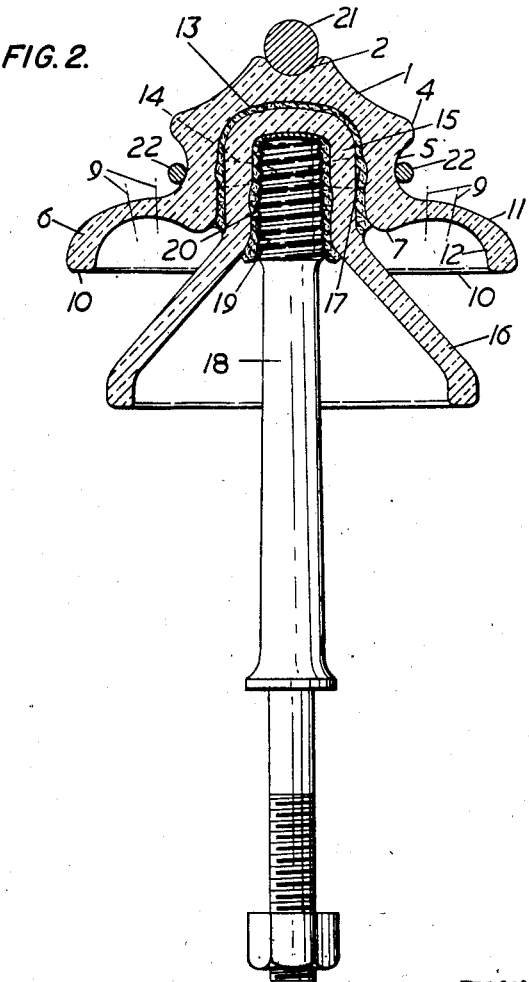

In order that the invention may be more clearly understood, a preferred embodiment will now be described, by way of example, with reference to the accompanying diagrammatic drawings, in which:

Figure 1 is a central vertical section of an insulator constructed according to the invention and Figure 2 is a similar view showing the insulator illustrated in Fig. 1 and a lower shed carried on a mounting pin as a unit assembly. Like references designate similar parts.

The glass insulator which is intended to be used for supporting power lines is a pressing which comprises a hollow head 1 including a diametrical recess 2, for a power line, at the top of the vertical axis 3—3, the wall of the head including an annular shoulder 4 below which is an annular recess 5 adapted to receive the usual binding wire for the line, the pressing also including radially outward (i.e. at right angles from the axis 3—3) from the bottom of the recess 5 a skirt 6, the head being extended below the top of the skirt to produce the base 7 of the head.

Generally speaking, therefore, the hollow head is of cylindrical form with a recessed top and sides, firmly set within the upper part of the skirt, which latter is thickest at the bottom and progressively decreases in thickness towards a zone in the upper part of the skirt as now to be described.

In the radial portion of the skirt 6 and near to the head 1 an annular zone 8 having a mean width of about half an inch is formed during the pressing operation, which zone is of minimum thickness in the middle, and symmetrically increases in thickness from the middle of the zone, which latter is defined by the chain lines 9—9, the upper and under surfaces of the zone being confluent with the surfaces of the ambient glass. The skirt 6 progressively increases in thickness on the outside of the zone towards the rim 10 of the skirt, and on the inner side towards the base 7 of the head, the zone 8 having a convex face 11 on the outside and a concave face 12 on the inside.

The interior of the head 1, in known manner provides a socket 13 with two internal pockets 14, each extending substantially halfway round the interior of the head, which socket receives the hollow head 15, Fig. 2, of the usual lower glass shed which comprises a conical skirt 16. A cementitious lining 17 to the head 1 fills the space between the heads 1 and 15 including the pocket 14 and makes an interlocking joint therebetween. The interior of the head 15 likewise forms a socket for the top of a usual mounting pin 18 which is shrouded by an externally threaded copper ferrule 19, the latter being interlocked with the head 15 by a cementitious lining 20 therein. Thus the pin 18, the lower glass shed 15—16 and the insulator 1—6 form an integral whole which carries a line indicated at 21 held to the unit assembly by a binding wire 22, Fig. 2.

By utilising the constructional form hereinbefore described a mechanically sound insulator structure is devised, and after the pressed article has been subjected to the usual temperature-equalising treatment and then cooled by simultaneously and symmetrically directing gentle streams of cooling gas, such as air or steam, on to the whole external and internal surface thereof, as shown by the arrows in Fig. 1, an insulator of sufficient strength is produced to carry out not only the normal load of the cable, but also the seasonal extra loads such as are produced by snow and other conditions derived from low temperatures.

Experiments have shown that not only is an insulator, constructed according to the invention, of the requisite strength to take the normal and seasonal loads, but the head of the insulator will not be adversely affected as a consequence of a fracture in the skirt below the zone 8, which zone has the function of preventing the propagation of fracture initiated in the skirt below the zone, through the zone to the head, and therefore the usual metal cap, which is cemented to the head, is not required to hold the fractured head together in order to sustain the power line.

We claim:

A method of manufacturing a glass insulator for carrying an electrical power line, which comprises moulding the insulator with a head, a skirt and a radial portion between said head and said skirt having an annular zone near the head of less thickness than that of the ambient glass, equalising the temperature throughout the moulded insulator to a temperature close to the softening point of the glass insulator, and then cooling the insulator from the equalized temperature simultaneously and symmetrically over the whole external and internal surfaces of the insulator with a fluid medium at a gentle rate to toughen the insulator as a whole to a limited degree but to toughen said annular zone to a greater extent due to the greater rate of cooling in said annular zone resulting from its lesser thickness to cause said annular zone to constitute a barrier to the propagation of a fracture in the skirt to the head.

References Cited in the file of this patent

UNITED STATES PATENTS

| | | |
|---|---|---|
| 1,483,461 | Littleton | Feb. 24, 1924 |
| 1,844,549 | Headley et al. | Feb. 9, 1932 |
| 2,177,324 | Long | Oct. 24, 1939 |
| 2,198,734 | Littleton | Apr. 30, 1940 |
| 2,254,227 | Lewis | Sept. 2, 1941 |
| 2,269,060 | Mitford | Jan. 6, 1942 |
| 2,287,976 | Croskey et al. | June 30, 1942 |
| 2,344,630 | Mylchreest | Mar. 21, 1944 |
| 2,375,944 | Quentin | May 15, 1945 |
| 2,418,713 | Holmes et al. | Apr. 8, 1947 |
| 2,762,166 | Vent | Sept. 11, 1956 |

FOREIGN PATENTS

| | | |
|---|---|---|
| 450,464 | Great Britain | July 17, 1936 |